Figure 1:
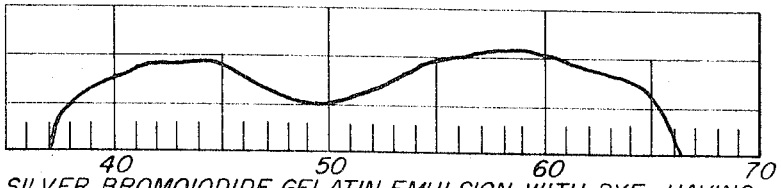
Figure 2:
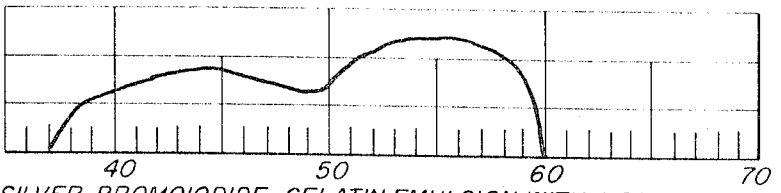
Figure 3:
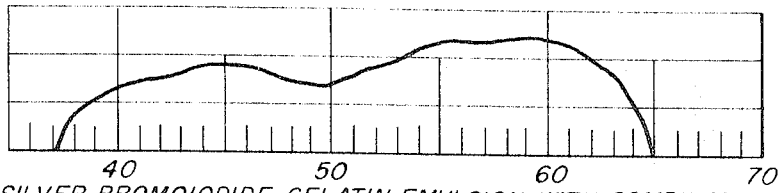
Figure 4:
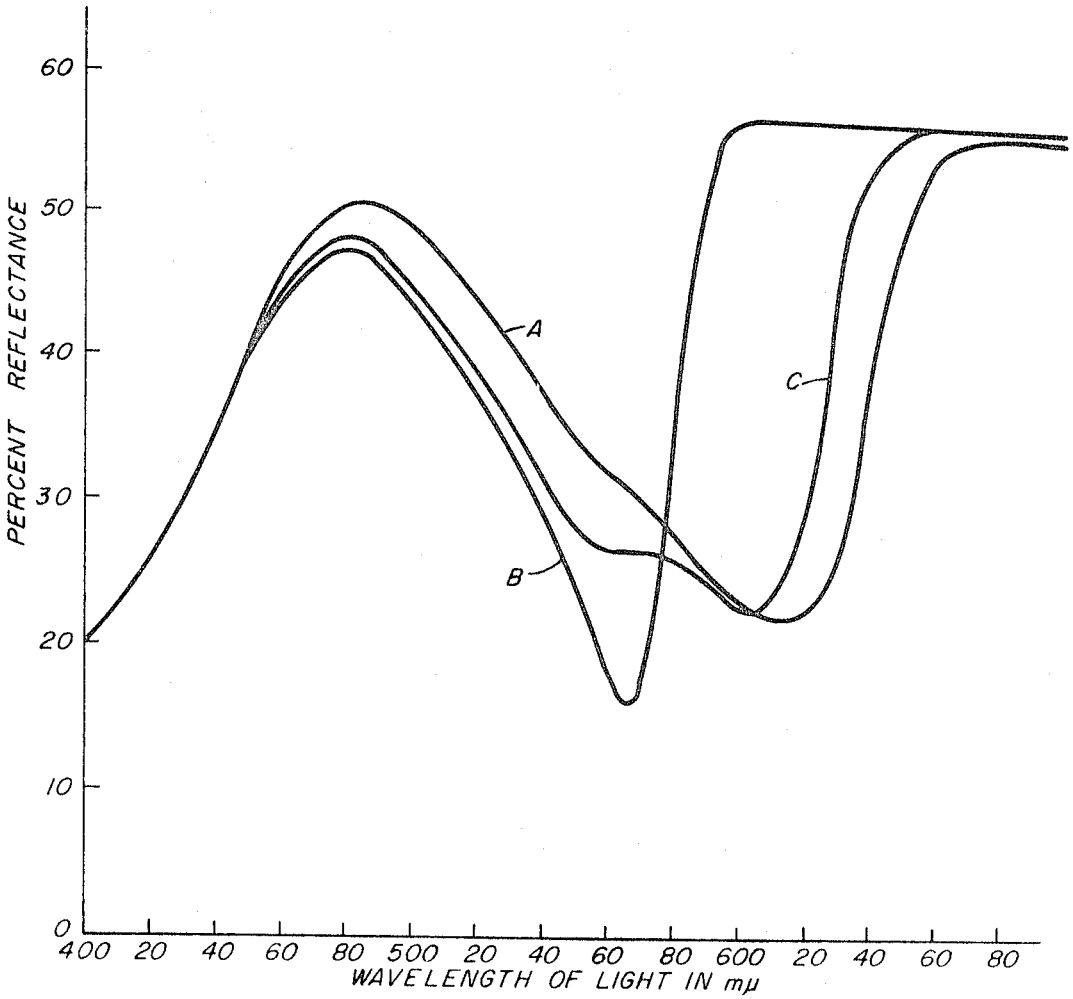

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 707

T888,015
SUPERSENSITIZED PHOTOGRAPHIC SILVER HALIDE EMULSIONS

Norman W. Kalenda, 1669 Lake Ave., Rochester, N.Y. 14615

Filed Dec. 4, 1970, Ser. No. 95,125
**Int. Cl. G03c *1/28***
U.S. Cl. 96—124
2 Sheets Drawing. 3 Pages Specification

Photographic silver halide emulsions are supersensitized by incorporating in the emulsion benzimidazolocarbocyanine dyes with unsymmetrical carbocyanine dyes having 1H-imidazo[4,5-b]quinoline nuclei. An example is a gelatin-silver bromoiodide emulsion of the type described by Trivelli et al. [Phot. Journ. 79, 330 (1939)] coated at 300 mg./ft.$^2$ on a cellulose acetate film base and containing 0.08 mg./mol Ag of 4,4′,5,5′-tetrachloro-1,1′,3,3′-tetraethyl - benzimidazolocarbocyanine iodide and 0.08 mg./mol Ag of 1,3,3′-triethyl-1H-imidazo[4,5-b]quinothiacarbocyanine iodide. Other supersensitizing dye combinations for such emulsion include: (a) 5,5′-dichloro-1,1′,3,3′ - tetramethylbenzimidazolocarbocyanine iodide and 1,3,3′-triethyl-1H-imidazo[4,5 - b]quinothiacarbocyanine iodide; (b) 5,5′-dichloro-1,1′,3,3′-tetraethylbenzimidazolocarbocyanine iodide and 1,3,3′-triethyl-1H-imidazo[4,5-b]quinothiacarbocyanine iodide; and (c) 5,5′,6,6′-tetrabromo-1,1′,3,3′-tetraethylbenzimidazolocarbocyanine iodide and 1,3,3′-triethyl-1H-imidazo[4,5-b]-quinothiacarbocyanine iodide.

SUPERSENSITIZED PHOTOGRAPHIC SILVER HALIDE EMULSIONS

Filed Dec. 4, 1970 2 Sheets-Sheet 1

SILVER BROMOIODIDE GELATIN EMULSION WITH DYE HAVING 1H-IMIDAZO [4,5-b] QUINOLINE NUCLEUS

SILVER BROMOIODIDE GELATIN EMULSION WITH A BENZIMIDAZOLO-CARBOCYANINE DYE

SILVER BROMOIODIDE GELATIN EMULSION WITH COMBINATION OF DYES OF FIGS. 1&2

NORMAN W. KALENDA
INVENTOR.

BY

ATTORNEY

SUPERSENSITIZED PHOTOGRAPHIC SILVER HALIDE EMULSIONS

Filed Dec. 4, 1970 2 Sheets-Sheet 2

NORMAN W. KALENDA
INVENTOR.

BY

William E. Mackey
ATTORNEY